United States Patent [19]
Krajec et al.

[11] Patent Number: 5,540,542
[45] Date of Patent: Jul. 30, 1996

[54] HDA HEADLOAD CARRIAGE TOOLING

[75] Inventors: Russell S. Krajec, Berthoud; Vincent Preston, Longmont, both of Colo.

[73] Assignee: Maxtor Corporation, San Jose, Calif.

[21] Appl. No.: 153,221

[22] Filed: Nov. 16, 1993

[51] Int. Cl.⁶ .................................................. B66B 1/04
[52] U.S. Cl. .................. 414/751; 294/103.1; 294/119.1; 294/65.5; 901/40
[58] Field of Search ........................... 414/751, 737, 414/741, 736, 737; 901/40; 294/119.1, 902, 103.1, 65.5, 87.1

[56] References Cited

U.S. PATENT DOCUMENTS

| | | | |
|---|---|---|---|
| 3,302,968 | 2/1967 | Bleiman et al. | 294/103.1 X |
| 4,422,487 | 12/1983 | McCurdy | 294/103.1 X |
| 4,482,289 | 11/1984 | Inaba et al. | 414/736 |
| 4,696,501 | 9/1987 | Webb | 294/103.1 X |

*Primary Examiner*—Donald W. Underwood

[57] ABSTRACT

A tool that loads magnetic heads onto the disk of a hard disk drive. The tool has a first arm which has an alignment block and a plurality of fingers. The first arm cooperates with a second arm which has an alignment slot and a plurality of second fingers. The arms are coupled to an actuator which moves the arms in opposite directions to separate the first fingers from the second fingers. Movement of the arms also causes a first alignment surface of the alignment block to engage a second alignment surface of the alignment slot. The alignment surfaces are essentially parallel with the fingers and insure that the fingers translate relative to each other without any relative rotational movement.

3 Claims, 4 Drawing Sheets

HDA HEADLOAD CARRIAGE TOOLING

BACKGROUND OF THE INVENTION

1. Field of the Invention

The present invention relates to a tool for loading magnetic heads onto the magnetic disk(s) of a hard disk drive.

2. Description of Related Art

Hard disk drives contain magnetic disk which spin relative to one or more magnetic heads. The magnetic heads are suspended above the surface of the magnetic disk by an actuator arm which has a magnet/coil assembly that moves the head relative to the disk. During operation, the head is supported above the surface of the disk by a high pressure air gap that is created by the rotation of the disk.

Disk drives are typically assembled by first mounting a spin motor and actuator arm assembly to a baseplate, and then attaching the magnetic disk to the motor. To provide clearance for the installation of the motor and the magnetic disk, the disk and actuator arm are initially mounted so that the magnetic head is located away from the disk. After the magnetic disk and actuator arm are installed, the head is rotated to a position above the disk. The head loading process is typically performed with some type of automated tooling, which lifts and rotates the head onto the disk.

Actuator arms typically have a large aspect ratio, resulting in an arm that is relatively flexible and weak. Consequently the arms tend to sag under the force of gravity. If multiple heads are being loaded onto the disk, the heads must be separated to assure clearance above the surface of the disk. Therefore most conventional head loading tools have means to separate and support multiple magnetic heads when the heads are being loaded onto the disk. One common type of head loading tool contains two sets of fingers which can engage the heads and move relative to each other in a scissor-like fashion. Relative movement of the fingers separates the magnetic heads, so that the heads clear the disk surface when the actuator arm is rotated above the disk. The separation of the magnetic heads must be sufficient to insure that the heads do not come into contact with the surface of the disk during the loading process. Contact between the head and the disk surface may cause damage to the head, resulting in a defective drive unit. Defective drive units lower the yield of the assembly process and invariable raise the cost of production.

The actual amount of movement by the fingers is on the order of a few thousandths of an inch. Head loading tool must therefore be very accurate. The fingers of most scissor type head loading tools extend from arms that are coupled to actuators. The actuators move the arms in opposite directions, thereby causing the fingers to separate. The arms are typically cantilevered from the actuators and are susceptible to rotational movement. Any rotational movement of the arms will effect the accuracy and repeatability of the tool. It would therefore be desirable to have a scissor type head loading tool that provides highly accurate and repeatable movement between the fingers of the arms.

SUMMARY OF THE INVENTION

The present invention is a tool that loads magnetic heads onto the disk of a hard disk drive. The tool has a first arm which has an alignment block and a plurality of fingers. The first arm cooperates with a second arm which has an alignment slot and a plurality of second fingers. The arms are coupled to an actuator which moves the arms in opposite directions to separate the first fingers from the second fingers. Movement of the arms also causes a first alignment surface of the alignment block to engage a second alignment surface of the alignment slot. The alignment surfaces are essentially parallel with the fingers and insure that the fingers translate relative to each other without any relative rotational movement. The pure translational finger movement produces a head loading tool that is both accurate and repeatable.

Therefore it is an object of the present invention to provide a head loading tool that is both accurate and repeatable.

It is also an object of the present invention to provide a scissor type head loading tool with a guide feature to insure translation movement between the fingers of the tool.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
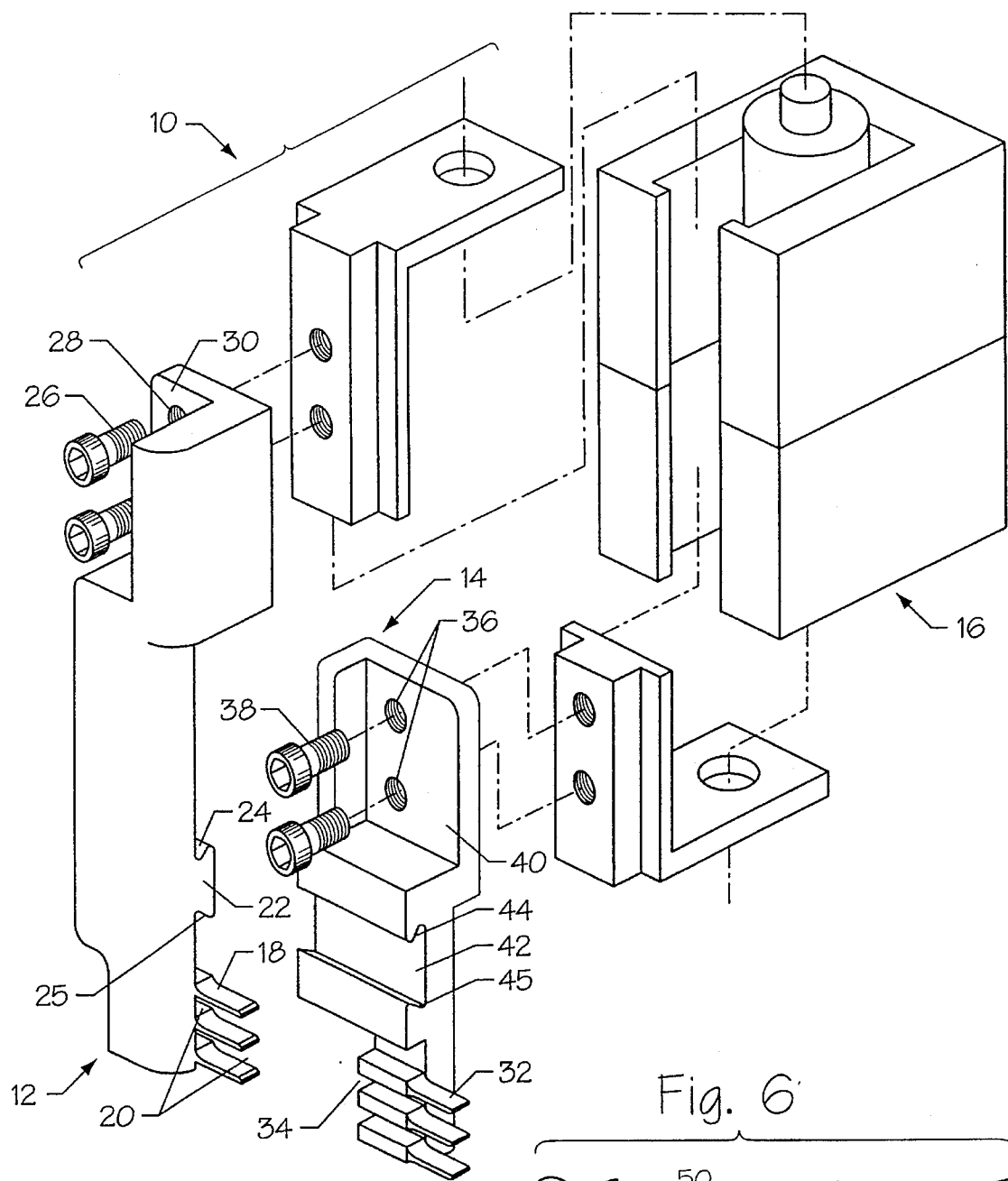
FIG. 1 is an exploded view of a tool of the present invention.

Referring to the drawings more particularly by reference numbers, FIG. 1 shows the components of a tool 10 of the present invention. The tool 10 has a first arm 12 and a second arm 14 which are both coupled to an actuator arm assembly 16. Extending from one end of the first arm 12 are a plurality of first fingers 18. The first fingers 18 are separated by finger slots 20. The first arm 12 also has an alignment block 22 which has a first top alignment surface 24 and a first bottom alignment surface 25. The alignment block 22 is preferably constructed to have a trapezoid shaped cross-sectional area commonly referred to as a dove-tail. The first arm 12 is connected to the actuator 16 by screws 26 that extend through clearance holes 28 located in a slot 30 within the arm 12.

The second arm 14 has a plurality of second fingers 32 separated by finger slots 34. At the opposite end of the arm 14 are a pair of apertures 36 that provide clearance for screws 38 that connect the second arm 14 to the actuator 16. The apertures 36 are located within a slot 40 in the arm 14. The second arm 14 also has an alignment slot 42 that is adapted to receive the alignment block 22 of the first arm 12. The alignment slot 42 is preferably shaped as a trapezoid and has a second top alignment surface 44 that engages the first top alignment surface 24 of the alignment block 22, and a second bottom alignment surface 45 which can engage the first bottom alignment surface 25.

Figure 2:
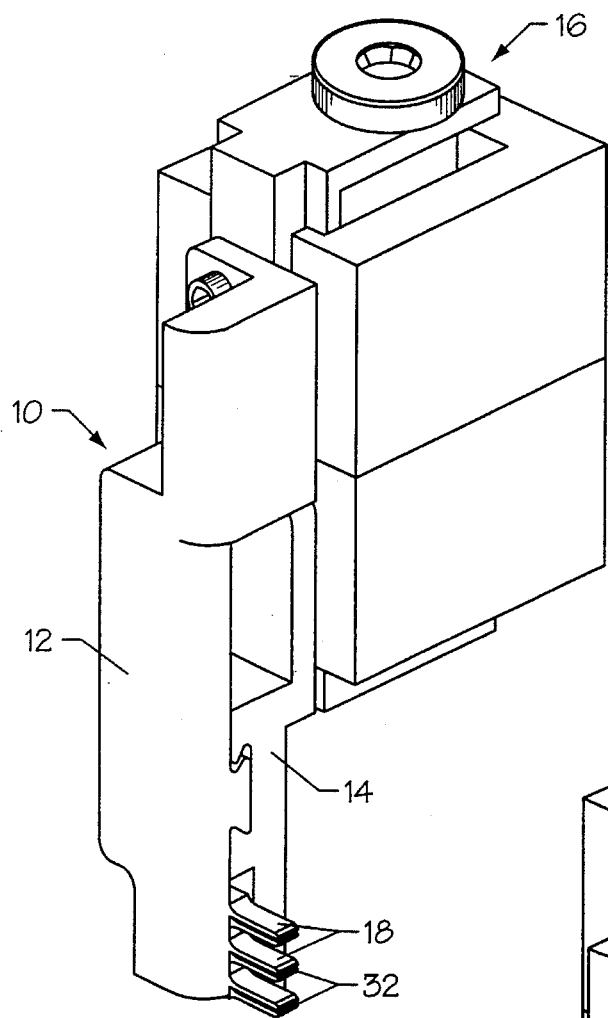
FIG. 2 is a perspective view of the tool in a closed position;.

As shown in FIG. 2, the arms 12 and 14 are attached to the actuator 16 so that the first fingers 18 are located within the finger slots 34 of the second arm 14 and the second fingers 32 are located within the finger slots 20 of the first arm 12. The actuator 16 is typically coupled to a robotic arm (not shown) which has at least two degrees of freedom. The tool 10 is used to load the magnetic heads 46 of an actuator arm assembly 48 onto the magnetic disks 50 of a hard disk drive.

Figure 3:
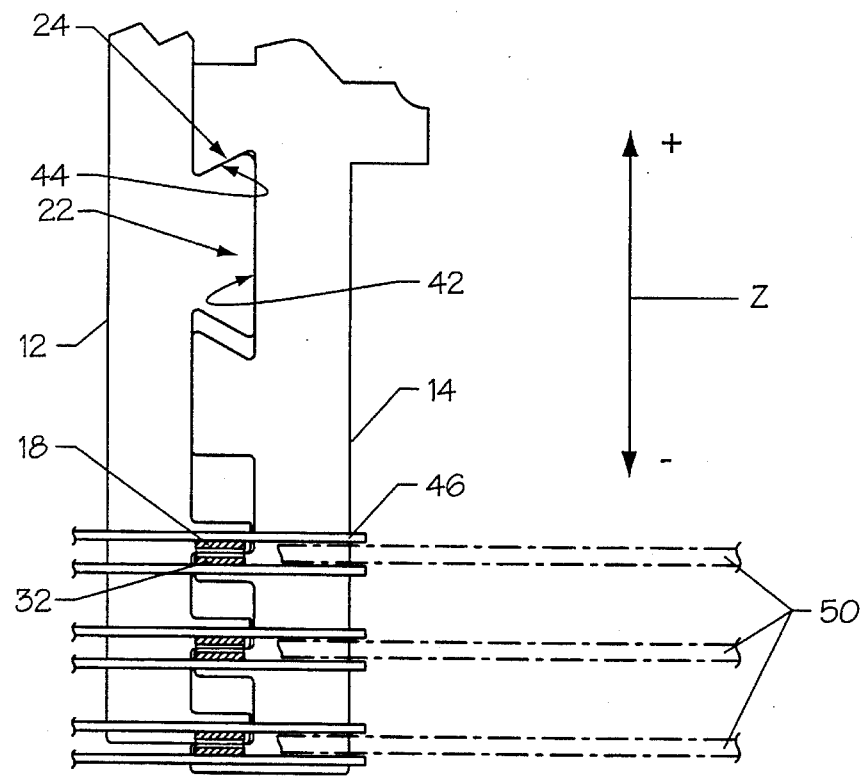
FIG. 3 is a side view of the tool inserted into an actuator arm assembly.
Figure 3A:
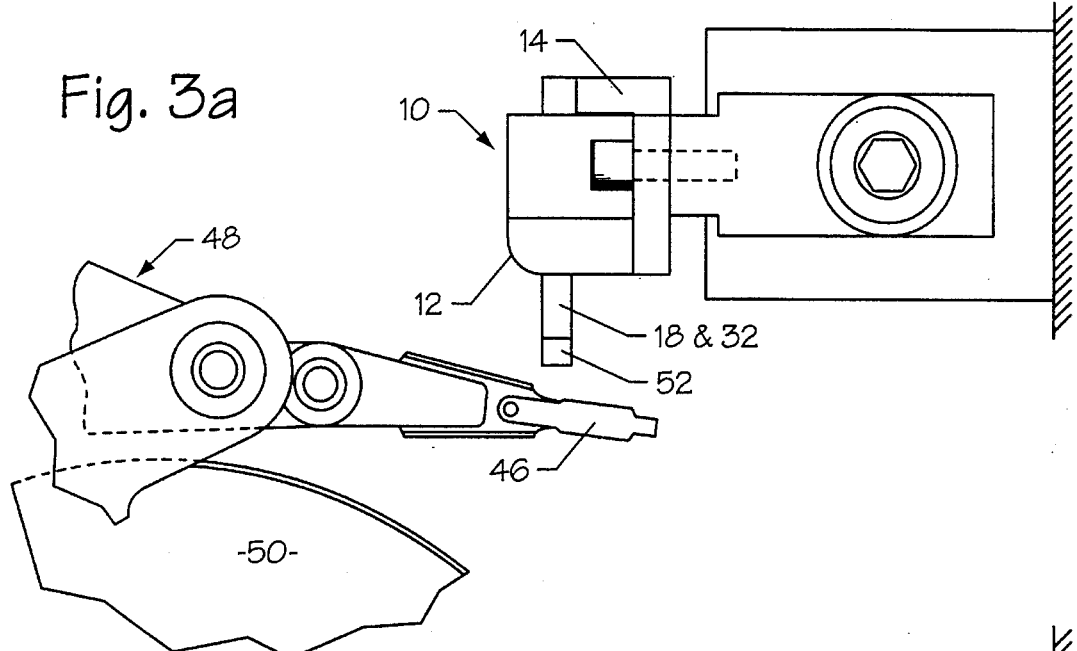
FIG. 3A is a top view of the tool before insertion into an actuator arm assembly.
Figure 3B:
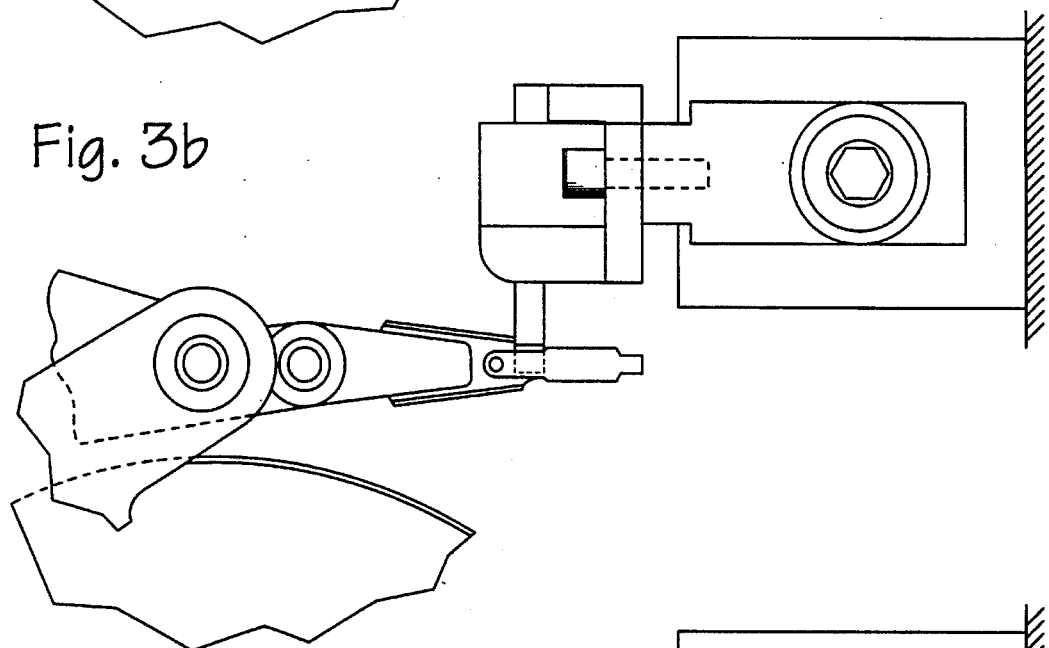
FIG. 3B is a top view of the tool inserted into an actuator arm assembly.

As shown in FIGS. 3, 3a and 3b, the tool 10 is moved by the robotic arm until the magnetic heads 46 are located between the fingers 18 and 32. The first 18 and second 32 fingers are constructed so that a single head 46 is supported by a corresponding finger. The fingers preferably have chamfers 52 that guide the heads 46 onto the fingers.

Figure 4:
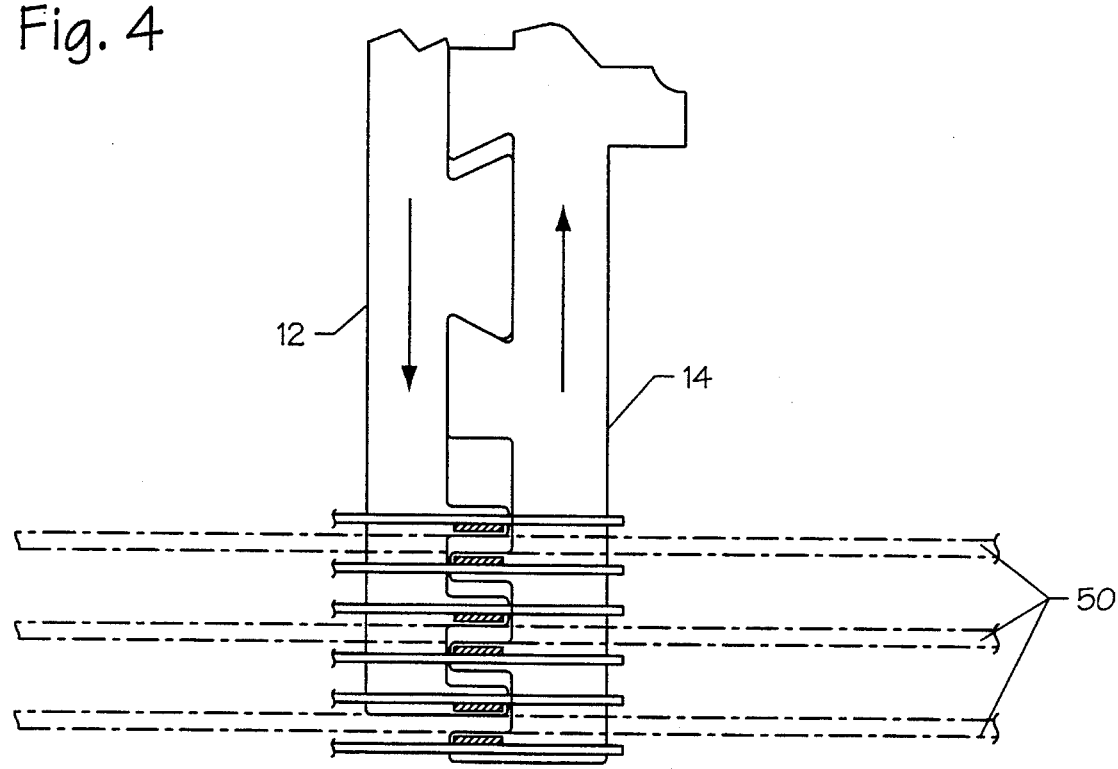
FIG. 4 is a side view of the tool in the closed position, wherein the actuator arms are further separated from the disks.
Figure 4A:
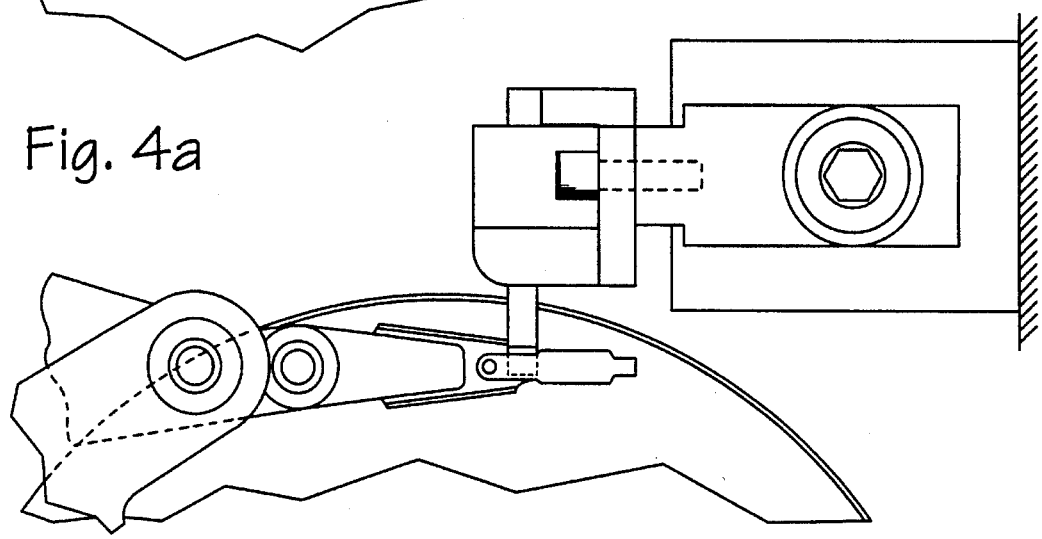
FIG. 4A is a top view showing the tool loading the heads onto the disks.

As shown in FIG. 4, after the heads are loaded onto the tool, the actuator 16 is actuated so that the first arm 12 moves in a positive direction along the z axis and the second arm 14 moves in a negative direction along the z axis. The relative movement of the arms further separates the first fingers 18 from the second fingers 32. Separation of the fingers moves the heads away from the surfaces of the disks. As shown in FIG. 4a, the tool 10 is then manipulated by the robotic arm so that the heads are located above and below the surfaces of the disks. The separation of the fingers insures that the heads do not come into contact with the disk surface when the heads are being rotated above the disk.

Figure 6:
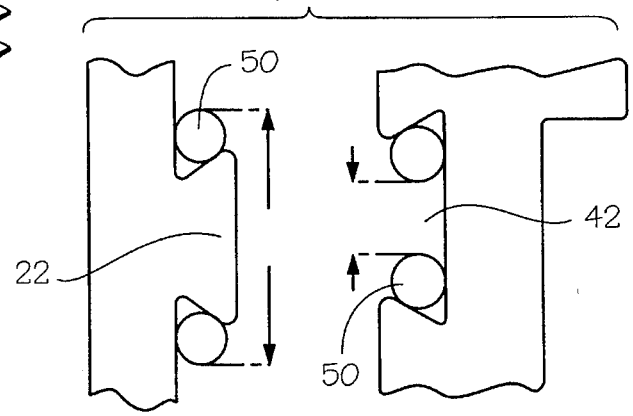
FIG. 6 is a cross-sectional view of the alignment block and alignment slot with gauge pins inserted therein.
Figure 5:
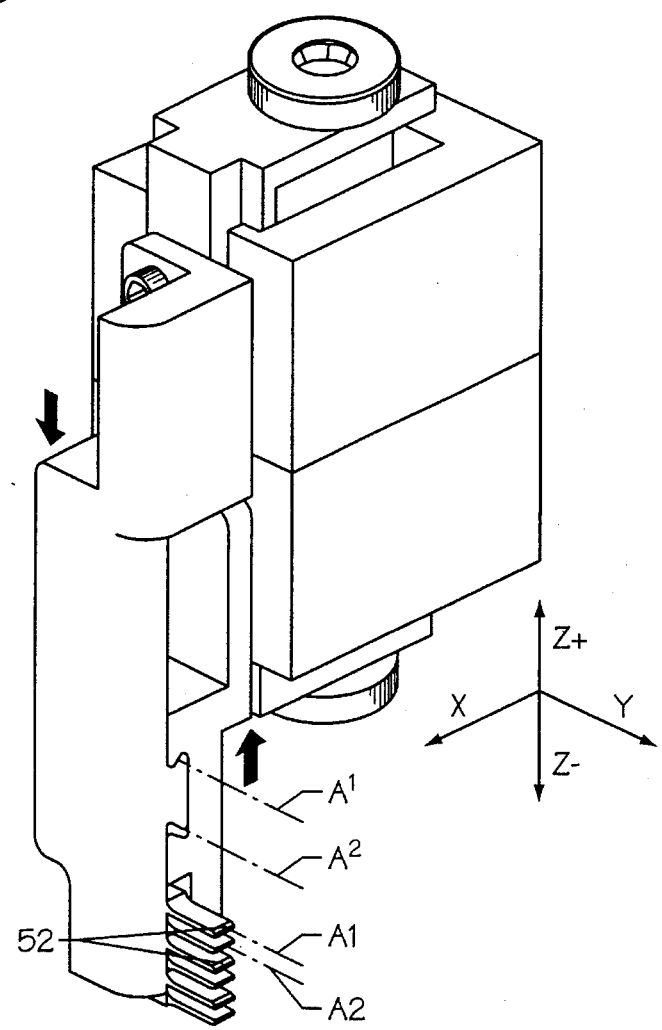
FIG. 5 is a perspective view of the tool shown in the open position.

As shown in FIG. 5, when the arms are moved relative to each other, the first top alignment surface 24 of the top alignment block 22 comes into contact with the second alignment surface 44 of the alignment slot 42. The arms are constructed so that engagement of the alignment surfaces insure that the fingers move relative to each other without any relative rotational movement. In the preferred embodiment, the first alignment surface is located along a first alignment axis A' which is essentially parallel with the longitudinal axes of the first fingers A'. The second alignment surface is located along a second alignment axis A" which is essentially parallel with the longitudinal axes A2 of the second fingers. As shown in FIG. 6, the block 22 and slot 42 should be constructed so that the edges of gauge pins 50 are essentially parallel with each other.

If either arm rotates when the fingers are separated by the actuator, the engagement of the alignment block and the alignment slot will correct the movement of the arms so that relative movement of the fingers is almost entirely translational. Additionally, the tool can be constructed so that the first bottom alignment surface 25 of the alignment block 22 engages the second bottom alignment surface 45 of the alignment slot 42 when the arms 12 and 14 move back to the original position shown in FIG. 2. The bottom alignment surfaces also prevent rotational movement of the fingers. Any non-translational movement of fingers may reduce the amount of separation between the heads. If the variance in head space is significant, the heads may come into contact with the disk surface when loaded onto the disk. The purely translational movement of the fingers of the present invention greatly reduces any variance in the head space and therefore provides a tool that is both accurate and repeatable.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A tool that loads a plurality of magnetic heads onto a magnetic disk, comprising:

a first arm which has an alignment block and a plurality of first fingers, said alignment block having a first alignment surface which extends along a first alignment axis that is essentially parallel with a longitudinal axis of a first finger;

a second arm which has an alignment slot and a plurality of second fingers, said alignment slot having a second alignment surface that engages said first alignment surface of said alignment block and which extends along a second alignment axis that is essentially parallel with a longitudinal axis of a second finger; and, actuator means for moving said first arm in a first z direction along a z axis and said second arm in an opposite second z direction along the z axis, wherein said first fingers move relative to said second fingers and said first alignment surface of said alignment block engages said second alignment surface of said alignment slot;

wherein the alignment block and the alignment slot each have trapezoid shaped cross-sectional areas with a range of movement for the first and second fingers being defined by the engagement of the first and second alignment surfaces.

2. The tool as recited in claim 1, wherein said alignment block has a first bottom alignment surface which engages a second bottom alignment surface of said alignment slot.

3. The tool as recited in claim 2, wherein said first and second arms each have three fingers.

\* \* \* \* \*